United States Patent
Nijdam et al.

(10) Patent No.: US 11,781,585 B2
(45) Date of Patent: Oct. 10, 2023

(54) CHANNEL FASTENER HAVING TAPERING SUPPORT BODY

(71) Applicant: J. VAN WALRAVEN HOLDING B.V., Mijdrecht (NL)

(72) Inventors: Frank Nijdam, Zeewolde (NL); Marek Juzak, Mudrecht (NL)

(73) Assignee: J. VAN WALRAVEN HOLDING B.V., Mijdrecht (NL)

( * ) Notice: Subject to any disclaimer, the term of this patent is extended or adjusted under 35 U.S.C. 154(b) by 353 days.

(21) Appl. No.: 17/288,754

(22) PCT Filed: Oct. 29, 2019

(86) PCT No.: PCT/NL2019/050710
§ 371 (c)(1),
(2) Date: Apr. 26, 2021

(87) PCT Pub. No.: WO2020/096447
PCT Pub. Date: May 14, 2020

(65) Prior Publication Data
US 2021/0396263 A1  Dec. 23, 2021

(30) Foreign Application Priority Data

Nov. 5, 2018 (NL) ........................... 2021934
Nov. 5, 2018 (NL) ........................... 2021935
(Continued)

(51) Int. Cl.
*F16B 37/04* (2006.01)
*F16B 39/282* (2006.01)

(52) U.S. Cl.
CPC .......... *F16B 37/046* (2013.01); *F16B 39/282* (2013.01); *F16B 37/04* (2013.01)

(58) Field of Classification Search
CPC .......... F16B 5/0092; F16B 5/10; F16B 21/02; F16B 21/06; F16B 21/08; F16B 37/04; F16B 37/046; F16B 39/282
(Continued)

(56) References Cited

U.S. PATENT DOCUMENTS 494,887 A   4/1893 Peterson
4,285,379 A   8/1981 Kowalski
(Continued)

FOREIGN PATENT DOCUMENTS

CN   102656376 A   9/2012
CN   102661307 A   9/2012
(Continued)

OTHER PUBLICATIONS

Chinese Office Action issued in corresponding Application No. 201980072448.5 dated Jul. 27, 2022, pp. 1-6.
(Continued)

*Primary Examiner* — Roberta S Delisle
(74) *Attorney, Agent, or Firm* — Tutunjian & Bitetto, P.C.

(57) ABSTRACT

A channel fastener for fastening an object to an elongate channel element having an elongate slot flanked by flanges includes an assembly of a rigid washer element, an oblong metal anchoring element and a support for the anchoring element, which support is connected to the washer element and carries the anchoring element. The support includes a head portion coupled to the washer element, a bottom portion supporting the anchoring element from below, and connecting legs, extend along a longitudinal side of the anchoring element from the head portion to the bottom portion. The head portion and the connecting legs of the support form a tapering width from the head portion towards the bottom portion of the support. At least the head portion
(Continued)

at the location where it adjoins the legs has an initial width that exceeds the width of the longitudinal slot.

25 Claims, 6 Drawing Sheets

(30) Foreign Application Priority Data

Nov. 5, 2018 (NL) ...................................... 2021936
Nov. 5, 2018 (NL) ...................................... 2021937

(58) Field of Classification Search
USPC .......................................... 411/347, 349, 552
See application file for complete search history.

(56) References Cited

U.S. PATENT DOCUMENTS

| | | | | |
|---|---|---|---|---|
| 4,830,531 A * | 5/1989 | Condit | .................. | F16B 37/045 403/348 |
| 6,726,117 B2 * | 4/2004 | Herb | ..................... | F16B 37/046 238/315 |
| D494,887 S | 8/2004 | Walraven | | |
| 2007/0138350 A1 | 6/2007 | Brown et al. | | |
| 2010/0202851 A1 * | 8/2010 | Rass | ..................... | F16B 37/045 411/133 |
| 2012/0315106 A1 * | 12/2012 | Amedt | .................... | F16B 7/187 411/85 |

FOREIGN PATENT DOCUMENTS

| | | |
|---|---|---|
| DE | 19821255 A1 | 11/1999 |
| DE | 29824254 U1 | 9/2000 |
| EP | 0837256 A1 | 4/1998 |
| EP | 1024302 A1 | 8/2000 |
| EP | 2980425 A1 | 2/2016 |
| GB | 2355776 A | 5/2001 |
| WO | 2018153928 A1 | 8/2018 |

OTHER PUBLICATIONS

International Search Report and Written Opinion for PCT/NL2019/050710 dated Mar. 9, 2020 (6 pages).
Search Report and Written Opinion for NL2021934 dated Feb. 6, 2019 (11 pages).
Search Report and Written Opinion for NL2021935 dated Feb. 7, 2019 (9 pages).
Search Report and Written Opinion for NL2021936 dated Feb. 4, 2019 (9 pages).
Search Report and Written Opinion for NL2021937 dated Feb. 5, 2019 (9 pages).

* cited by examiner

CHANNEL FASTENER HAVING TAPERING SUPPORT BODY

TECHNICAL FIELD

According to a first aspect the invention relates to a channel fastener for fastening an object to an elongate channel element, wherein said channel element has a bottom, an upper side opposite the bottom and lateral walls that interconnect the upper side and the bottom, wherein the upper side includes flanges that extend from the lateral walls towards each other and a longitudinal slot defined between the flanges and having a slot width,
wherein the fastener comprises an assembly of:
a rigid washer element, preferably made of metal, having a bearing face that is arranged for resting against the outer side of the flanges of the channel element,
an oblong metal anchoring element having a width smaller than the slot width and a larger length larger than the slot width, said anchoring element being located on the side of the washer element where the bearing face is located and has longitudinal end portions adapted to engage an inner side of the respective flanges of the channel element,
a support for the anchoring element, which support is connected to the washer element, possibly detachably, and which support carries the anchoring element,
the fastener having between the washer element and each longitudinal end portion of the anchoring element an accommodation space which is accessible from the side of the fastener, each accommodation space being adapted for the accommodation of a flange of the channel element, in such a way that the fastener with its oblong anchoring element can be aligned with the longitudinal slot and the anchoring element can be inserted through the longitudinal slot into the channel element, and in such a way that subsequently after turning of the fastener, preferably a quarter turn, the anchoring element extends at an angle, preferably substantially at right angles, relative to the longitudinal slot, so that the flanges of the channel element are located in the accommodation spaces, wherein the anchoring element and the washer element can subsequently be tensioned towards each other wherein the longitudinal end portions of the anchoring element engage the inner side of the flanges of the channel element in order to fix the fastener to the channel element,
wherein the support comprises:
a head portion having one or more coupling members, which coupling members, possibly detachably, couple the washer element to the support,
a bottom portion which supports the anchoring element from below, and
connecting legs, each extending from the head portion to the bottom portion below the anchoring element, and connecting the head portion and the bottom portion, wherein the connecting legs extend along a longitudinal side of the oblong anchoring element. Such a channel fastener is typically used with channel elements, in the technical field concerned often called mounting rails. A particular type of mounting rail that the channel fasteners are used with is known in the field as a "strut rail", which is a mounting rail having generally a C-shaped cross section, wherein the flanges are folded inwardly such that the edges of the flanges are facing the bottom of the rail. However, the channel fasteners can also be used with normal C-shaped rails, having flanges that extend with their edges towards each other, or other channel type profiles that have flanges defining a slot between them.

DESCRIPTION OF RELATED ART

The U.S. Design Pat. No. 494,887 shows a channel fastener for use with mounting rails. This known channel fastener is an assembly of a metal washer element, a plastic support and a metal anchoring element. The metal anchoring element is formed as an oblong nut with a threaded bore in the centre. On an upper side of the oblong nut grooves are formed which extend in the transverse direction. This is typical for channel fasteners which are used in combination with strut rails. The edges of the respective flanges of the strut rail are in a mounted state received in the respective grooves on the upper side of the nut. The plastic support is an integrally formed part including a cage which carries the metal anchoring element, and furthermore including a head portion that is connected to the washer. Two opposite spring elements surrounding the washer element are connected to the head portion and are adapted to engage flanges of the channel element. The oblong anchoring element of the fastener can be aligned with the longitudinal slot of a channel element and subsequently the anchoring element can be inserted through the longitudinal slot into the channel element. Subsequently after turning of the fastener, the anchoring element extends at an angle relative to the longitudinal slot, such that the flanges of the channel element are located in accommodation spaces between the washer element and longitudinal end portions of the anchoring element. In this position the spring elements engage the flanges of the channel element and pull the fastener upwards such that the longitudinal end portions of the anchoring element are pulled in engagement with the flanges of the channel element. In this state the channel fastener is in a preliminary mounting state, in which it is held stationary on the channel element by the spring force of the spring elements and can still be readily moved along the channel element towards its desired position. When the fastener is in its desired position, the anchoring element and the washer element can be tensioned towards each other by means of a male fastening element such as a threaded rod screwed in the oblong anchoring element and a nut engaging the washer element. The flanges of the channel element are thereby clamped between the longitudinal end portions of the anchoring element and the washer element in order to fix the fastener to the channel element.

SUMMARY OF THE INVENTION

It is an object of the present invention to provide a channel fastener which allows an easier first positioning and retaining into the desired position on the channel element.

This object can be achieved by a channel fastener for fastening an object to an elongate channel element, wherein said channel element has a bottom, an upper side opposite the bottom and lateral walls that interconnect the upper side and the bottom, wherein the upper side includes flanges that extend from the lateral walls towards each other and a longitudinal slot defined between the flanges and having a slot width,
wherein the fastener comprises an assembly of:
a rigid washer element, preferably made of metal, having a bearing face that is arranged for resting against the outer side of the flanges of the channel element, an oblong metal anchoring element having a width smaller than the slot width and a larger length larger than the slot width, said anchoring element being located on the side of the washer element where the bearing face is located and has longitudinal end portions adapted to engage an inner side of the respective flanges of the channel element, a support for the anchoring element, which support is connected to the washer element, possibly detachably, and which support carries the anchoring element, the fastener having between the washer element and each longitudinal end portion of the anchoring element an accommodation space which is accessible from the side of the fastener, each accommodation space being adapted for the accommodation of a flange of the channel element, in such a way that the fastener with its oblong anchoring element can be aligned with the longitudinal slot and the anchoring element can be inserted through the longitudinal slot into the channel element, and in such a way that subsequently after turning of the fastener, preferably a quarter turn, the anchoring element extends at an angle, preferably substantially at right angles, relative to the longitudinal slot, so that the flanges of the channel element are located in the accommodation spaces, wherein the anchoring element and the washer element can subsequently be tensioned towards each other wherein the longitudinal end portions of the anchoring element engage the inner side of the flanges of the channel element in order to fix the fastener to the channel element, wherein the support comprises:

a head portion having one or more coupling members, which coupling members, possibly detachably, couple the washer element to the support, a bottom portion which supports the anchoring element from below, and connecting legs, each extending from the head portion to the bottom portion below the anchoring element, and connecting the head portion and the bottom portion, wherein the connecting legs extend along a longitudinal side of the oblong anchoring element, wherein the support is made of an elastic material and in that the head portion and the connecting legs of the support form a tapering width from the head portion towards the bottom portion of the support, wherein at least the head portion at the location where it adjoins the legs has an initial width that exceeds the width of the longitudinal slot, such that when the anchoring element is aligned with the longitudinal slot of the channel element and inserted through the slot in the channel element, the legs and/or the head portion rub against the flanges and are/is elastically compressed such that the fastener can be held clamped between the flanges in a first preliminary mounting state.

The support of the channel fastener according to the invention is made of an elastic material, preferably a thermoplastic material. The head portion and the connecting legs of the support form a tapering width from the head portion towards the bottom portion of the support. At least the head portion at the location where it adjoins the legs has an initial width that exceeds the width of the longitudinal slot of the channel element, such that when the anchoring element is aligned with the longitudinal slot of the channel element and inserted through the slot in the channel element, the legs and/or the head portion rub against the flanges and are/is elastically compressed such that the fastener can be held clamped between the flanges in a first preliminary mounting state. The user can position the fasteners according to the invention roughly on the channel element using the first preliminary mounting state before turning the fastener to a second preliminary mounting state. Both in the first and second preliminary mounting state the fastener can be shifted along the channel element.

In a preferred embodiment of the channel fastener according to the invention, the support is made of a thermoplastic material. In practice the thermoplastic support will be made by an injection moulding process.

In a possible embodiment of the channel fastener according to the invention, the head portion of the support comprises a main body having a central passage from the washer element towards the anchoring element, wherein two longitudinal slits extend from the central passage in the main body, said longitudinal slits being opened wide in an unloaded state and being closed in the first preliminary mounting state. The central opening allows a male fastener, such as a threaded rod, to be passed through the main body to extend from the anchoring element to the washer element. In a non-loaded state the slits are spread open. When the anchoring element is aligned with the slot of the channel element, the slits extend substantially parallel with the slot of the channel element. When the channel fastener is inserted in the slot, the slits are closed by the compression force provided by the flanges in cooperation with the tapering width form of the head and the legs of the support. When the main body is turned to a second preliminary mounting state, it will not rub against the flanges anymore and the slits will open again by the elasticity of the main body.

In a possible embodiment of the channel fastener according to the invention, the support includes one or more spring members associated with the head portion of the support, wherein said spring members force the bottom portion and the anchoring element towards the inner side of the flanges of the channel element in a second preliminary mounting state in which the flanges are located in the accommodation spaces. The spring elements provide a holding force to keep the channel fastener in position on the channel element, in the second preliminary mounting state. In a possible embodiment the spring members extend from the head portion of the support element into the accommodation space, such that when the fastener is rotated in the channel element towards the second preliminary mounting state, the spring members will be deformed and tensioned by the flanges of the channel element.

In another possible embodiment the spring members may be associated with the bottom portion of the support and resiliently support the anchoring element from below, such that when the fastener is rotated in the channel element towards the second preliminary mounting state, the spring members will be deformed and tensioned by the anchoring element which is forced towards the bottom portion by the flanges of the channel element. The anchoring element is thus resiliently held against the inner side of the flanges in the second preliminary mounting state.

In another possible embodiment of the channel fastener according to the invention, the bottom portion comprises a bottom plate supporting the anchoring element and upstanding wall members extending upwardly from the bottom plate, wherein the upstanding wall members includes at least a longitudinal wall portion that extends at the longitudinal end portions of the anchoring element along a side of the anchoring element having the largest length, and wherein the upstanding wall portions have a height that exceeds the thickness of the anchoring element, such that when the anchoring element is in engagement with the bottom plate, an upper edge of the upstanding wall is located above the anchoring element and such that when the fastener is in the position wherein the flanges of the channel element are located in the accommodation spaces, the upper edge of the upstanding wall portions engage the inner side of the flanges in said second preliminary mounting state.

The upstanding wall members may be located at two diagonally opposite corners of the oblong anchoring element.

In a further embodiment the wall members furthermore comprise a transversal wall portion extending at an angle, preferably perpendicular, to the longitudinal wall portion, and forming a corner piece with the corresponding longitudinal wall portion.

In a possible embodiment the spring members are formed as tongues which extend obliquely from the head portion towards the anchoring element.

In a possible embodiment a blocking finger is formed on an end of at least one of the spring members, wherein said blocking finger extends in the second preliminary mounting state beyond the edge of at least one of the flanges and a side wall of the channel element, so as to block unintentional rotation of the fastener from the second preliminary mounting state.

In a possible embodiment the support includes one or more resilient retention fingers having a proximal end connected to the head portion and a distal end located near or in contact with the anchoring element, so as to retain the anchoring element on the bottom portion of the support.

A second aspect of the invention relates to a problem of the known channel fastener of U.S. D 494,887, which is that the force with which the anchoring element is forced in engagement with the flanges in the preliminary mounting state depends on the thickness or height of the anchoring element, while in practise the thickness or height of the anchoring element can vary considerably, for example due to manufacturing tolerances. The force also determines how well the fastener is maintained in position on the channel element, but also determines how easy the fastener can be moved towards the desired position along the channel element in the preliminary mounting state, in which the flanges of the channel element are located in the accommodation spaces of the fastener. This problem comes forward even more when the fastener is used with a strut rail and the anchoring element has grooves. Often the downwardly pointing edges of the flanges of the strut rail are provided with notches or are serrated. Also the grooves in the anchoring element may have notches which engage with the notches or serrations of the flange edges.

The second aspect of the invention has for an object to provide a channel fastener that mitigates the mentioned problem.

According to the second aspect the invention relates to a channel fastener for fastening an object to an elongate channel element having a bottom, an upper side opposite the bottom and lateral walls that interconnect the upper side and the bottom, wherein the upper side includes flanges that extend from the lateral walls towards each other and a longitudinal slot defined between the flanges and having a slot width,
  wherein the fastener comprises:
    a rigid washer element, preferably made of metal, which has a bearing face that is arranged for resting against the outer side of the flanges of the channel element,
    an oblong metal anchoring element having a width smaller than the slot width and a larger length larger than the slot width, said anchoring element being located on the side of the washer element where the bearing face is located and has longitudinal end portions adapted to engage an inner side of the respective flanges of the channel element,
    a support for the anchoring element, which support which support is made of an elastic material and is connected to the washer element, possibly detachably, and which support bears the anchoring element,
    the fastener having between the washer element and each longitudinal end portion of the anchoring element an accommodation space which is accessible from the side of the fastener, each accommodation space being adapted for the accommodation of a flange of the channel element, in such a way that the fastener with its oblong anchoring element can be aligned with the longitudinal slot and the anchoring element can be inserted through the longitudinal slot into the channel element, and in such a way that subsequently after turning of the fastener, preferably a quarter turn, the anchoring element extends at an angle, preferably substantially at right angles, relative to the longitudinal slot, so that the flanges of the channel element are located in the accommodation spaces, wherein the anchoring element and the washer element can subsequently be tensioned towards each other wherein the longitudinal end portions of the anchoring element engage the inner side of the flanges of the channel element in order to fix the fastener to the channel element,
    wherein the support comprises:
      a head portion having one or more coupling members, which coupling members, possibly detachably, couple the washer element to the support,
      a bottom portion which supports the anchoring element from below, and
      connecting legs, each extending from the head portion to the bottom portion below the anchoring element, and connecting the head portion and the bottom portion, wherein the connecting legs extend along a longitudinal side of the oblong anchoring element,
    wherein the bottom portion comprises a bottom plate supporting the anchoring element and one or more upstanding wall members extending upwardly from the bottom plate, wherein the upstanding wall members includes at least a longitudinal wall portion that extends at the longitudinal end portions of the anchoring element along a side of the anchoring element having the largest length, and
    wherein the support includes one or more spring members forcing the bottom portion with the anchoring element towards the inner side of the flanges of the channel element in a preliminary mounting state in which the flanges are located in the accommodation spaces,
    wherein the upstanding wall portions have a height that exceeds the thickness of the anchoring element, such that when the anchoring element is in engagement with the bottom plate, an upper edge of the upstanding wall is located above the anchoring element and such that when the fastener is in the position wherein the flanges of the channel element are located in the accommodation spaces, the upper edge of the upstanding wall portions engage the inner side of the flanges in said preliminary mounting state.

An advantage of the one or more upstanding wall portions engaging the inner side of the flanges is that it does not depend on the thickness of the anchoring element how easy the fastener can be slid along the channel element. The dimensional relation between the upstanding wall portion and the spring members can be well defined in the design of the support. Therefore, and also due the flexible nature of the upstanding wall portion the channel fastener can provide a fairly constant and predefined holding force by the support itself, independent of the anchoring element the support is assembled with. The force needed to overcome the friction to move the fastener along the channel element is thus also constant and predetermined.

In a possible embodiment of the fastener according to the second aspect of the invention, the upstanding wall members are located at two diagonally opposite corners of the oblong anchoring element. In this way each flange of the channel element engages only one upstanding wall portion. Thereby the resistance against movement of the channel fastener along the channel element can be well defined.

In another possible embodiment of the fastener according to the second aspect of the invention, the wall members furthermore comprise a transversal wall portion extending at an angle, preferably perpendicular, to the longitudinal wall portion, and forming a corner piece with the corresponding longitudinal wall portion. The transversal wall portion provides rigidity to the wall member, and also provides a locking means to retain the anchoring element on the bottom portion of the support in the longitudinal direction.

In yet another possible embodiment of the fastener according to the second aspect of the invention the one or more spring members are associated with the head portion of the support. Preferably the spring members extend from the head portion of the support element into the accommodation space, such that when the fastener is rotated in the channel element towards the second preliminary mounting state, the spring members will be deformed and tensioned by the flanges of the channel element. In a further possible embodiment the spring members are formed as tongues which extend obliquely from the head portion towards the anchoring element.

In a possible further embodiment, a blocking finger is formed on an end of at least one of the spring members, wherein said blocking finger extends in the second preliminary mounting state beyond the edge of at least one of the flanges and a side wall of the channel element, so as to block unintentional rotation of the fastener from the second preliminary mounting state. This may for example be useful when the channel fastener is released from a fixed state, in which the washer element and the anchoring element are clamped by a threaded rod/nut connection against the flanges of the channel element to a preliminary mounting state in which the channel fastener can be shifted along the channel element.

In a possible embodiment of the fastener according to the second aspect of the invention, the support is made of a thermoplastic material. The support can be made of a thermoplastic material by an injection moulding process, whereby the dimensional relations between the spring members and the wall portions can be warranted and at the same time the required elasticity is provided.

In a possible embodiment of the fastener according to the second aspect of the invention, the support includes one or more resilient retention fingers having a proximal end connected to the head portion and a distal end located near or in contact with the anchoring element, so as to retain the anchoring element on the bottom portion of the support. The retention fingers allow that anchoring elements having varying thicknesses can be assembled with the same support whilst the anchoring element is securely retained on the bottom portion by the retention fingers.

A third aspect of the invention relates to a problem that may occur with the known channel fastener of U.S. D 494,887 is that when it is mounted on a channel element and secured by a male fastening element, e.g. a threaded rod, and a cooperating nut, it may in some occasions be necessary to release the nut so as to be able to move the channel fastener along the channel element or rail. However, releasing the nut means that a rotational force is applied on the assembly of the channel fastener and the male fastening element, which may cause the channel fastener to be rotated out of the preliminary mounting state in which the flanges are located in the accommodation spaces. Thereby the fastener may be unintentionally loosened and displaced or even removed from the channel element. An object of the invention is to at least mitigate the problem of unintentional rotation of the channel fastener on the channel element.

This object is achieved by a channel fastener according to a third aspect the invention. This aspect relates to a channel fastener for fastening an object to an elongate channel element having a bottom, an upper side opposite the bottom and lateral walls that interconnect the upper side and the bottom, wherein the upper side includes flanges that extend from the lateral walls towards each other and a longitudinal slot defined between the flanges and having a slot width, wherein the fastener comprises:
a rigid washer element, preferably made of metal, which has a bearing face that is arranged for resting against the outer side of the flanges of the channel element,
an oblong metal anchoring element having a width smaller than the slot width and a larger length larger than the slot width, said anchoring element being located on the side of the washer element where the bearing face is located and has longitudinal end portions adapted to engage an inner side of the respective flanges of the channel element,
a support for the anchoring element, which support is connected to the washer element, possibly detachably, and which support bears the anchoring element,
the fastener having between the washer element and each longitudinal end portion of the anchoring element an accommodation space which is accessible from the side of the fastener, each accommodation space being adapted for the accommodation of a flange of the channel element, in such a way that the fastener with its oblong anchoring element can be aligned with the longitudinal slot and the anchoring element can be inserted through the longitudinal slot into the channel element, and in such a way that subsequently after turning of the fastener, preferably a quarter turn, the anchoring element extends at an angle, preferably substantially at right angles, relative to the longitudinal slot, so that the flanges of the channel element are located in the accommodation spaces, wherein the anchoring element and the washer element can subsequently be tensioned towards each other wherein the longitudinal end portions of the anchoring element engage the inner side of the flanges of the channel element in order to fix the fastener to the channel element, wherein the support comprises:
a head portion having one or more coupling members, which coupling members, possibly detachably, couple the washer element to the support,
a bottom portion which supports the anchoring element from below, and
connecting legs, each extending from the head portion to the bottom portion below the anchoring element, and connecting the head portion and the bottom portion, wherein the connecting legs extend along a longitudinal side of the oblong anchoring element, wherein the support includes one or more spring members associated with the head portion of the support and adapted to engage an upper side of the flanges, wherein said spring members force the bottom portion with the anchoring element towards the inner side of the flanges of the channel element in a preliminary mounting state in which the flanges are located in the accommodation spaces, wherein a blocking finger is formed on an end of at least one of the spring members, wherein said blocking finger extends in the second preliminary mounting state beyond the edge of at least one of the flanges and a side wall of the channel element, so as to block unintentional rotation of the fastener from the second preliminary mounting state.

The blocking finger prevents that the entire channel fastener starts to rotate due to rotational forces applied to the fastener, e.g. when a nut is loosened on a threaded rod which is connected with the channel fastener. If the installing person wants to remove the channel fastener altogether, the flexibility of the spring members allows that the installer forces the blocking fingers over the edge of the flanges and lateral wall of the channel element again by lifting the spring members. However, if the spring members are not "helped" they are sturdy enough to keep the channel fastener in the preliminary mounting state on the channel element.

In a preferred embodiment of the channel fastener according to the third aspect of the invention, the spring members extend from the head portion of the support element into the accommodation space, such that when the fastener is rotated in the channel element towards the second preliminary mounting state, the spring members will be deformed and tensioned by the flanges of the channel element.

In a possible embodiment of the channel fastener according to the third aspect of the invention, the spring members are formed as tongues which extend obliquely from the head portion towards the anchoring element.

In a preferred embodiment of the channel fastener according to the third aspect of the invention, the support is made of a thermoplastic material. The support can be made of a thermoplastic material by an injection moulding process.

In a possible embodiment of the channel fastener according to the third aspect of the invention, the support includes one or more resilient retention fingers having a proximal end connected to the head portion and a distal end located near or in contact with the anchoring element, so as to retain the anchoring element on the bottom portion of the support. The retention fingers allow that anchoring elements having varying thicknesses can be assembled with the same support whilst the anchoring element is securely retained on the bottom portion by the retention fingers.

A fourth aspect of the invention relates to the problem that the known channel fastener of U.S. D 494,887 has retention lugs formed on an inner side of the connecting legs, which lugs engage over the upper edge of the anchoring element. A problem in practise is that the anchoring elements that are provided to an assembly line to assemble the channel fastener may have varying thicknesses due to for example manufacturing tolerances and variations in the blank material from which the anchoring element is made. The retention lugs of the known channel fastener are however not convenient in view of varying thicknesses of the anchoring element. If the anchoring element has a small thickness there may be a play between the lugs and the upper side of the anchoring element, which gives the assembly a non-robust feel and look. If the anchoring element is thicker the lugs may engage the side of the anchoring element instead of gripping over the upper edge. The retention is in that case based on friction which is less reliable than of the interlocking engagement when the lugs engage over the upper edge of the anchoring element.

A fourth aspect of the invention has for an object to provide a channel fastener able to reliably retain the anchoring element on the support.

This object can be achieved by a channel fastener for fastening an object to an elongate channel element according to a fourth aspect of the invention, having a bottom, an upper side opposite the bottom and lateral walls that interconnect the upper side and the bottom, wherein the upper side includes flanges that extend from the lateral walls towards each other and a longitudinal slot defined between the flanges and having a slot width, wherein the fastener comprises:
a rigid washer element, preferably made of metal, which has a bearing face that is arranged for resting against the outer side of the flanges of the channel element,
an oblong metal anchoring element having a width smaller than the slot width and a larger length larger than the slot width, said anchoring element being located on the side of the washer element where the bearing face is located and has longitudinal end portions adapted to engage an inner side of the respective flanges of the channel element,
a support for the anchoring element, which support which support is made of an elastic material and is connected to the washer element, possibly detachably, and which support bears the anchoring element,
the fastener having between the washer element and each longitudinal end portion of the anchoring element an accommodation space which is accessible from the side of the fastener, each accommodation space being adapted for the accommodation of a flange of the channel element, in such a way that the fastener with its oblong anchoring element can be aligned with the longitudinal slot and the anchoring element can be inserted through the longitudinal slot into the channel element, and in such a way that subsequently after turning of the fastener, preferably a quarter turn, the anchoring element extends at an angle, preferably substantially at right angles, relative to the longitudinal slot, so that the flanges of the channel element are located in the accommodation spaces, wherein the anchoring element and the washer element can subsequently be tensioned towards each other wherein the longitudinal end portions of the anchoring element engage the inner side of the flanges of the channel element in order to fix the fastener to the channel element, wherein the support comprises:
a head portion having one or more coupling members, which coupling members, possibly detachably, couple the washer element to the support,
a bottom portion which supports the anchoring element from below, and
connecting legs, each extending from the head portion to the bottom portion below the anchoring element, and connecting the head portion and the bottom portion, wherein the connecting legs extend along a longitudinal side of the oblong anchoring element, wherein the support includes one or more resilient retention fingers having a proximal end connected to the head portion and a distal end located near or in contact with the anchoring element, so as to retain the anchoring element on the bottom portion of the support.

The one or more retention fingers according to this aspect allow that anchoring elements having varying thicknesses can be assembled with the same support whilst the anchoring element is securely retained on the bottom portion by the retention fingers. The retention fingers are adapted to allow that the anchoring element is moved towards the washer element when the washer element and the anchoring element are tightened together by a male fastening element, possibly in cooperation with a nut. Thereto the retention fingers are resiliently deformable.

Preferably the retention fingers extend from the main body obliquely towards the upper side of the anchoring element and are adapted to retain the anchoring element on a bottom plate of the support in an unmounted state. The oblique position of the retention fingers facilitates their deformation for allowing the anchoring element to move towards the washer element.

In a possible embodiment of the channel fastener according to the fourth aspect of the invention the one or more retention fingers extend from the head portion downward and in transverse direction of the nut. This arrangement of the retention fingers prevents that the retention fingers interfere with the rotation of the fastener on the channel element to a preliminary mounting state in which the flanges of the channel element are received in the accommodation spaces of the channel fastener.

In a possible embodiment of the channel fastener according to the fourth aspect of the invention the retention fingers are arranged in pairs, wherein, preferably the retention fingers of one pair together generally form a V-shape.

In a possible further embodiment of the channel fastener according to the fourth aspect of the invention the support includes two pairs of retention fingers, one on each side of the body adjacent the accommodation spaces of the channel fastener.

In a possible embodiment of the channel fastener according to the fourth aspect of the invention the bottom portion comprises a bottom plate supporting the anchoring element and the retention fingers push the anchoring element against the bottom plate.

In a further embodiment of the channel fastener according to the fourth aspect of the invention the bottom portion includes upstanding wall members extending upwardly from the bottom plate, wherein the upstanding wall members includes at least a longitudinal wall portion that extends at the longitudinal end portions of the anchoring element along a side of the anchoring element having the largest length, and wherein the upstanding wall portions have a height that exceeds the thickness of the anchoring element, such that when the anchoring element is in engagement with the bottom plate, an upper edge of the upstanding wall is located above the anchoring element and such that when the fastener is in the position wherein the flanges of the channel element are located in the accommodation spaces, the upper edge of the upstanding wall portions engage the inner side of the flanges in said second preliminary mounting state.

In a possible embodiment of the channel fastener according to the fourth aspect of the invention the support includes one or more spring members associated with the head portion of the support, wherein said spring members force the bottom portion and the anchoring element towards the inner side of the flanges of the channel element in a preliminary mounting state in which the flanges are located in the accommodation spaces.

It is noted that several channel fasteners, in which various combinations of the mentioned aspects of the invention are incorporated, are envisaged within the scope of the present invention.

The invention also relates to a combination of a fastener according to any aspect of the invention as described in the above and a channel element having a bottom, an upper side opposite the bottom and lateral walls that interconnect the upper side and the bottom, wherein the upper side includes flanges that extend from the lateral walls towards each other and a longitudinal slot defined between the flanges and having a slot width, wherein the channel element is of the so called "strut rail" type, i.e. the channel element has inwardly folded flanges, wherein the flanges have edges that are facing the bottom of the channel element. In a possible embodiment the edge of the respective flanges are serrated.

The invention also relates to a method for assembling a fastener according to any aspect of the invention as described in the above to a channel element, wherein the channel fastener is mounted in a first preliminary state and a second preliminary state on the channel element before it is finally secured to the channel element.

BRIEF DESCRIPTION OF THE DRAWINGS

The invention will be further elucidated in the following description with reference to the drawing, wherein.

DETAILED DESCRIPTION

The present invention relates to a channel fastener adapted to be mounted on a channel element. Such a channel element is in practice also called a mounting rail.

Figure 9:
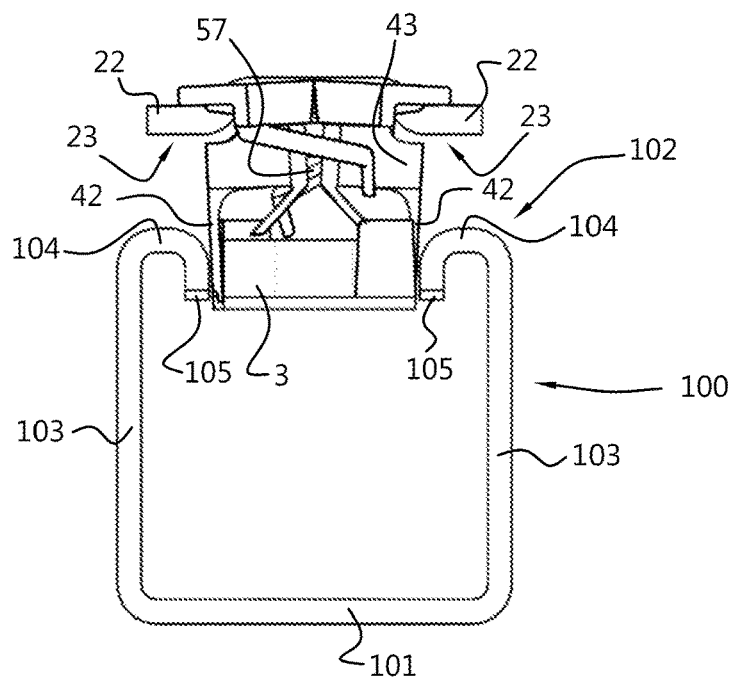
FIG. 9 shows a side elevational view of the fastener of FIG. 1 during insertion in the slot of a channel element.
Figure 13:
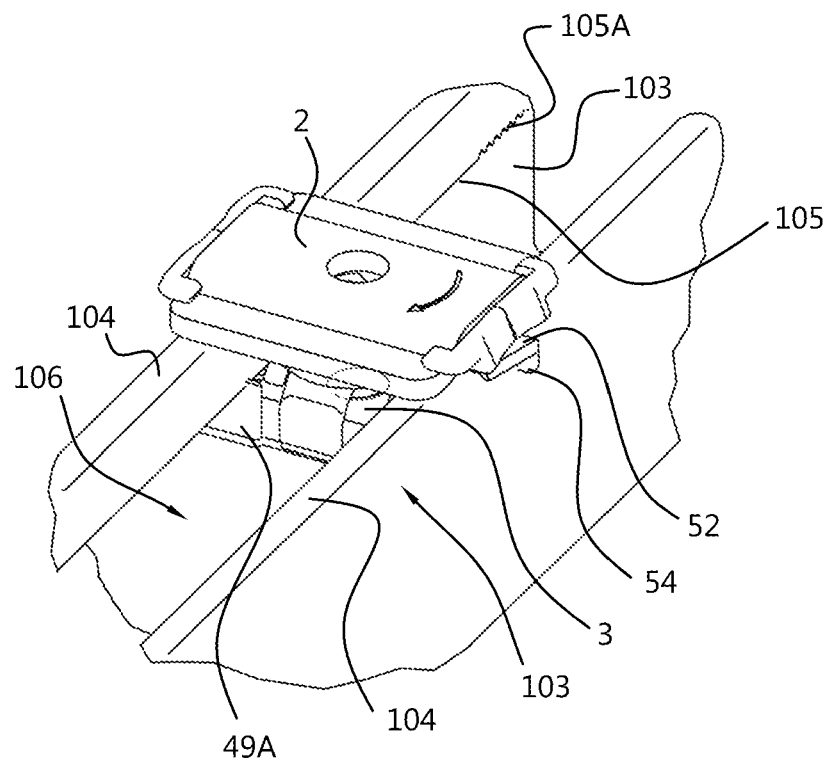
FIG. 13 shows in a view in perspective an assembly of the channel fastener of FIG. 1 arranged in a second preliminary mounting state on a channel element.
Figure 14:
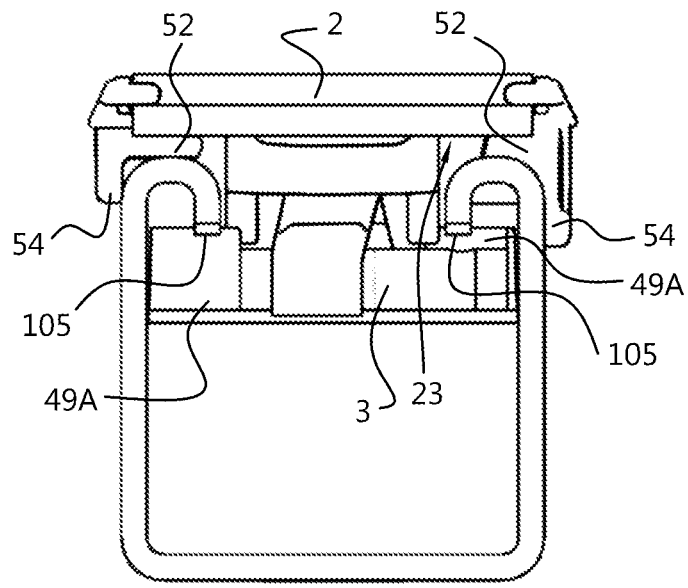
FIG. 14 shows a side elevational view of the assembly of FIG. 13, FIG. 15 show another side elevational view of the assembly of FIG. 13.
Figure 15:
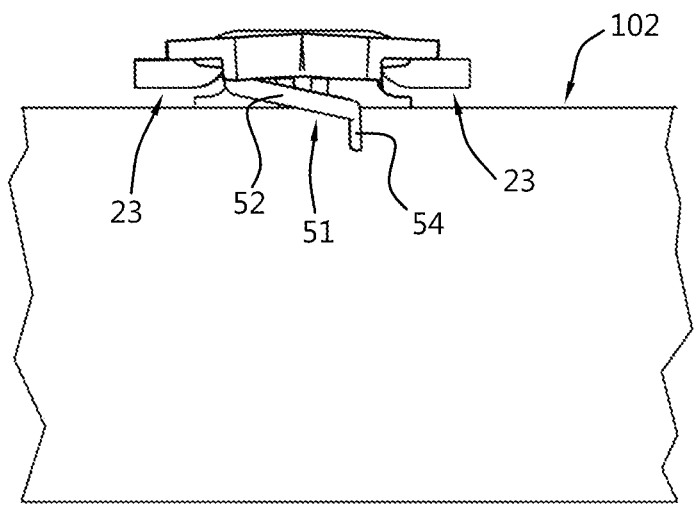
Figure 16:
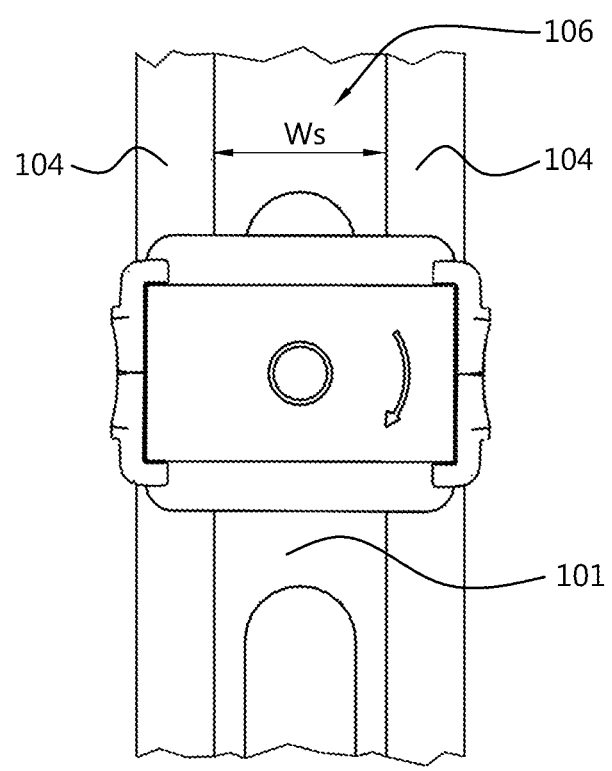
FIG. 16 shows a top elevational view of the assembly of FIG. 13.

In FIG. 9, FIG. 13 and FIG. 16 such a channel element or mounting rail is visible in cross section, perspective view and top elevation view, respectively. The mounting rail indicated by reference numeral 100 in general has a bottom 101, an upper side 102 opposite the bottom 101 and lateral walls 103 that interconnect the upper side 102 and the bottom 101. The upper side 102 of the channel element includes flanges 104 that extend from the lateral walls 103 towards each other and includes a longitudinal slot 106 defined between the flanges 104. The longitudinal slot 106 has a slot width $w_s$. The channel element 100 shown here is specifically called a "strut rail" in the technical field concerned. Such a strut rail has the characteristic that the flanges 104 are folded inwardly such that the edges 105 of the flanges 104 are pointing towards the bottom 101 of the channel element 100. It is noted that the invention will be explained in combination with a strut rail, which is a preferred channel element, but that a channel fastener according to the invention may also be used in combination with other channel elements, e.g. having a regular C-shaped cross section.

Figure 1:
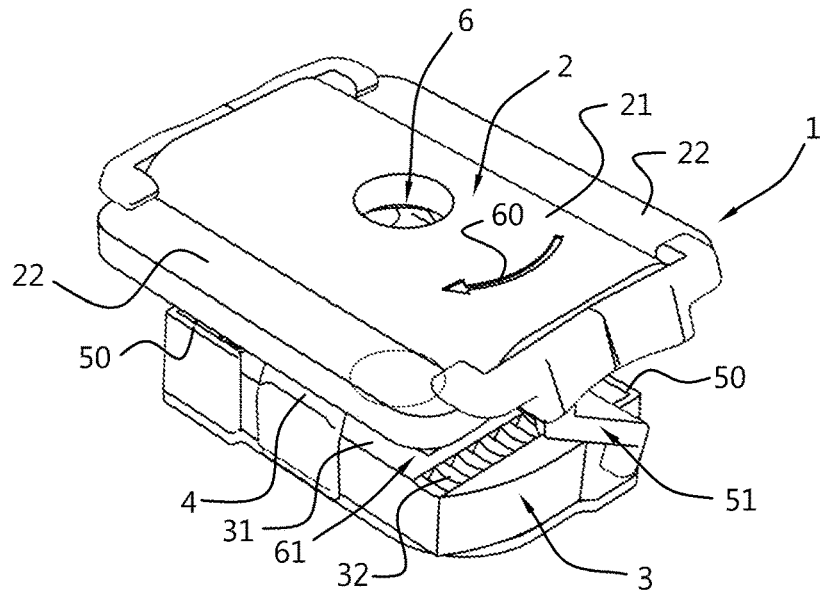
FIG. 1 shows in a first view in perspective a possible embodiment of the channel fastener according to the invention.
Figure 2:
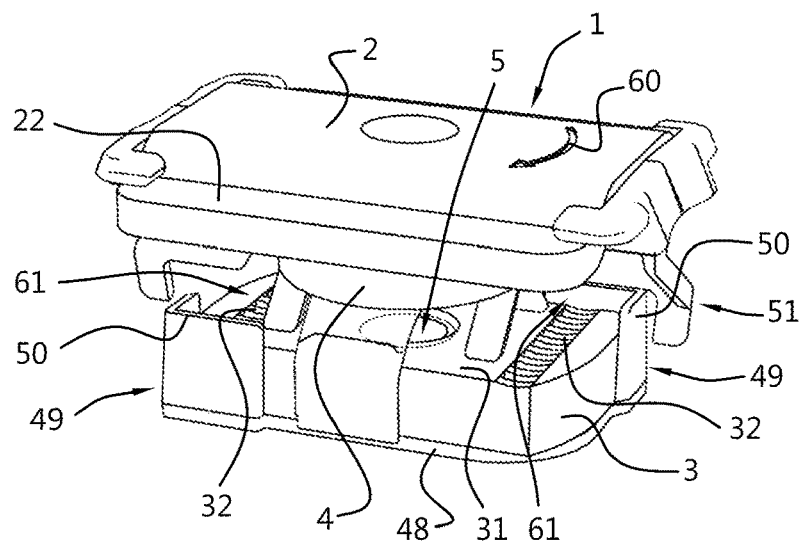
FIG. 2 shows in a second view in perspective the channel fastener of FIG. 1.
Figure 3:
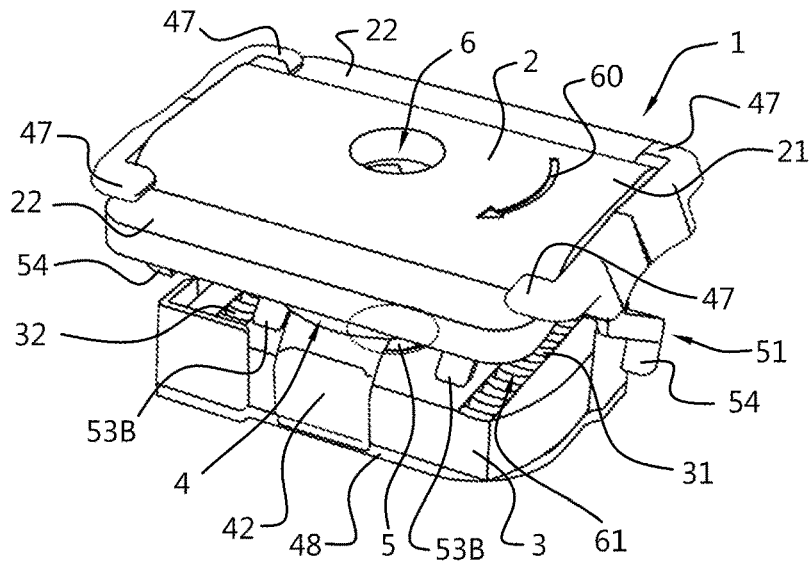
FIG. 3 shows in a third view in perspective the channel fastener of FIG. 1.

In FIGS. 1-3 a possible embodiment of a channel fastener according to the invention is shown and indicated by reference numeral 1.

The channel fastener 1 is an assembled part which generally comprises a washer element 2, an anchoring element 3, and a support 4. The washer element 2 is preferably made of metal, but may in some occasions also be made of a suitable plastic material, such as POM. The anchoring element 3 is made of metal. The support 4 is made of an elastic material which interconnects the washer element 2 and the anchoring element 3.

A suitable material for manufacturing the support element 4 is a thermoplastic material. The support 4 is in practice made from the thermoplastic material by an injection moulding process.

The metal washer 2 and the metal anchoring element 3 are made by suitable cutting, punching and forming processes, preferably out of steel strip or sheet material.

The anchoring element 3 may be formed as an elongate nut having a central threaded bore 5, adapted to cooperate with a shaft of a male fastening element such as a threaded rod or a bolt. The anchoring element 3 has a width $w_a$ that is smaller than the width $w_s$ of the slot 106 of the channel element 100. The anchoring element has a length $l_a$ which exceeds the width $w_s$ of the slot 106. On an upper side 31 of the anchoring element 3 grooves 32 are formed which extend in the transverse direction. These grooves 32 are typical for channel fasteners adapted for use on strut rails, wherein the edges 105 of the flanges 104 can be received in the grooves 32, at least in a final mounting state.

The washer element 2 has a central bore 6 for passing through the shaft of the male fastening element. In the shown embodiment the washer element 2 substantially has a rectangular or square outer contour. The washer element in this specific embodiment comprises a central strip 21, i.e. the strip in which the bore 6 is formed, and two lateral strips 22 which are offset relative to the central strip 21 in a thickness direction of the washer element 2, which can be seen also in FIGS. 4-6. The lateral strips 22 are adapted to rest with a bearing face 23 on the flanges 104 of the channel element 1 in final mounting state in which the washer element 2 and the anchoring element 3 are tightened towards each other by a male fastening element and a nut cooperating with the male fastening element wherein the nut engages the washer element 3 from above.

Figure 7:
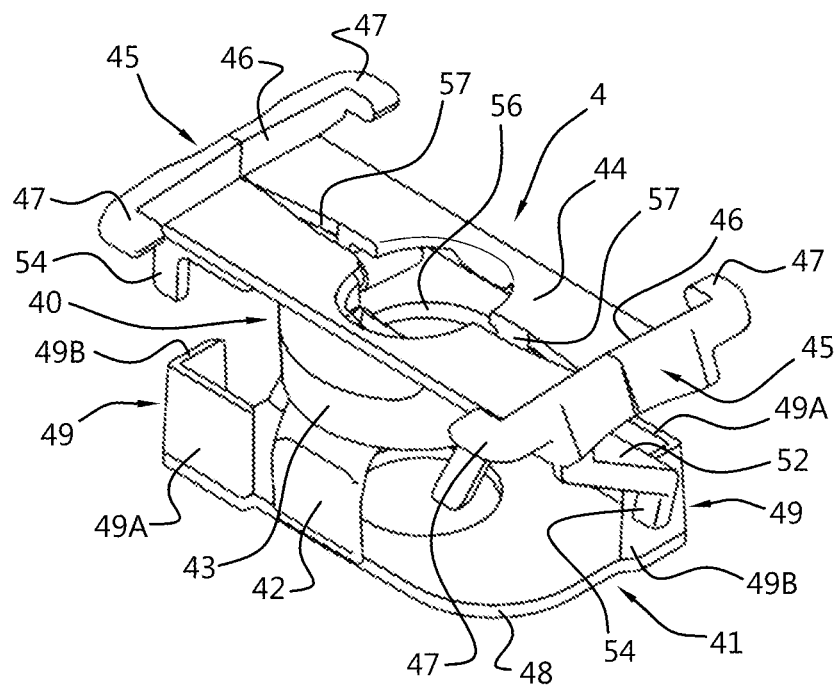
FIG. 7 shows in a first view in perspective a support of the channel fastener of FIG. 1.
Figure 8:
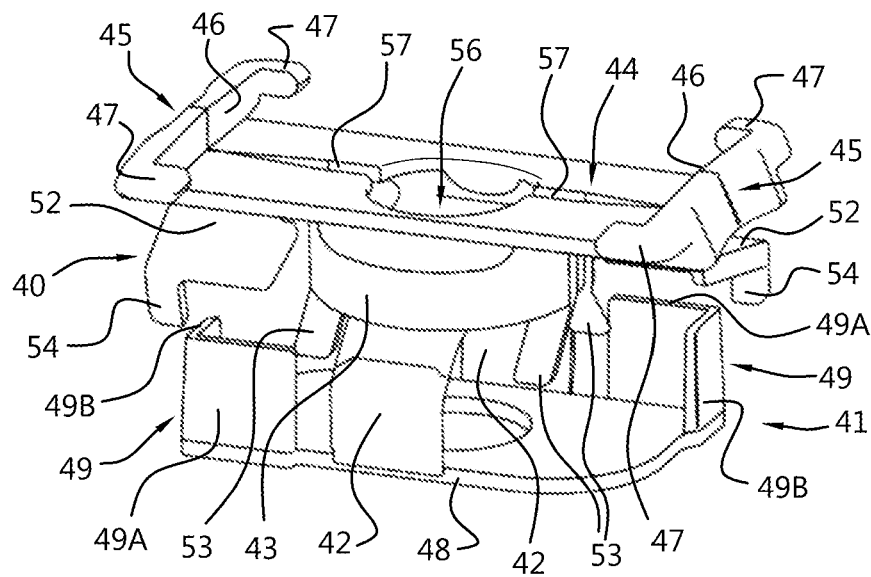
FIG. 8 shows in a second view in perspective the support of the channel fastener of FIG. 1.

The support 4, which is shown separately in FIGS. 7 and 8, comprises a head portion 40 and a bottom portion 41. The head portion 40 and the bottom portion 41 are interconnected by connecting legs 42.

In the specific embodiment shown in the figures, the head portion 40 comprises a main body 43, and a washer support plate 44 which is integrally formed with the main body 43. At the respective ends of the washer support plate 44 coupling members 45 are formed to couple the washer element 2 to the head portion 40 of the support 4. The coupling members 45 comprise each a stop ridge 46 which forms a stop for the head ends of the central strip 21 of the washer element 2. The coupling members 45 furthermore comprise retention fingers 47 at the ends of the stop ridge 46 which in the assembled state extend over the lateral strips 22 of the washer element 2 as can be best seen in FIGS. 3, 5 and 7. Since the central strip 21 of the washer element 2 lies in height offset with respect to the lateral strips 21, the retention fingers 47 lock the washer element 2 in the height direction and in the lateral direction. The stop ridge 46 locks the washer 2 in the longitudinal direction.

The main body 43 and the washer support plate 44 define a central passage 56 through which a male fastener, such as a threaded rod, can extend. Two longitudinal slits 57 extend from the central passage 56 in the main body 43 and in the washer supporting plate 44 each towards a respective longitudinal end of the washer support plate 44 where the coupling members 45 are formed. The longitudinal slits 57 are opened wide in an unloaded state as is visible in FIGS. 7, 8 and 11. The longitudinal slits 57 are closed in a first preliminary mounting state which will be described further below, and as is visible in FIG. 12

The bottom portion 41 is adapted to support the anchoring element 3 from below. The bottom portion 41 comprises in the specific embodiment shown in the figures a bottom plate 48, which supports the anchoring element 3 from below. The bottom portion 41 furthermore comprises upstanding wall members 49 extending upwardly from the bottom plate 48.

The upstanding wall members 49 comprise at least a longitudinal wall portion 49A that extends at the longitudinal end portions of the anchoring element 3 along the side of the anchoring element 3 having the largest length. The upstanding wall members 49 furthermore comprise a transversal wall portion 49B extending at an angle, in the specific embodiment of the figures perpendicular, to the longitudinal wall portion 49A, and forming a corner piece with the corresponding longitudinal wall portion 49A. The specific embodiment of the support 4 shown in the figures has at two diagonally opposite corners of the support plate 48 a corner piece or wall member 49 to lock the anchoring element 3 in the transversal and longitudinal direction.

Figure 4:
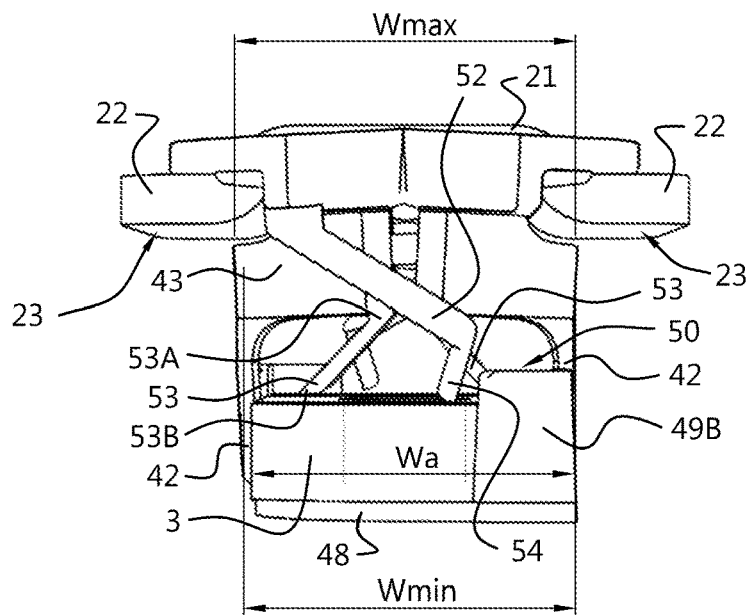
FIG. 4 shows a side elevational view from a transverse side of the channel fastener of FIG. 1.
Figure 5:
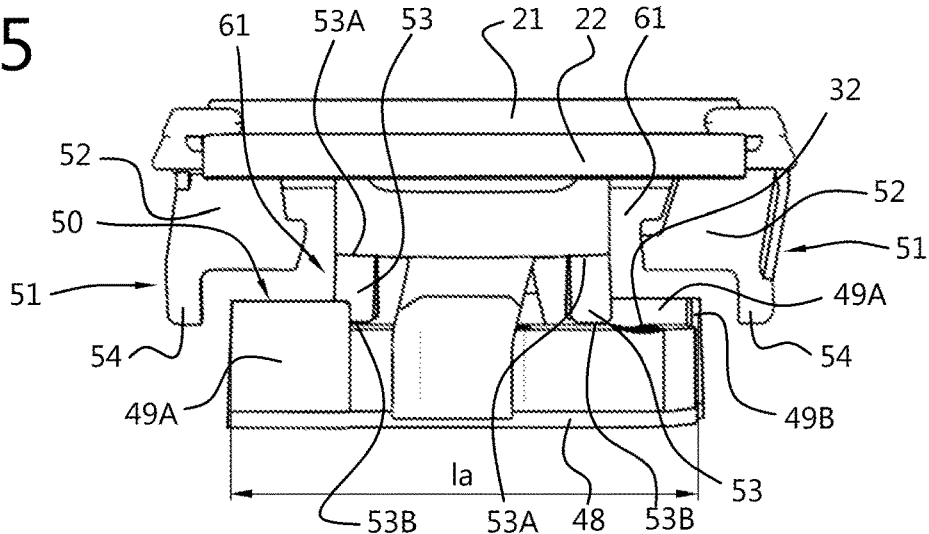
FIG. 5 shows a side elevational view from a longitudinal side of the channel fastener of FIG. 1.
Figure 6:
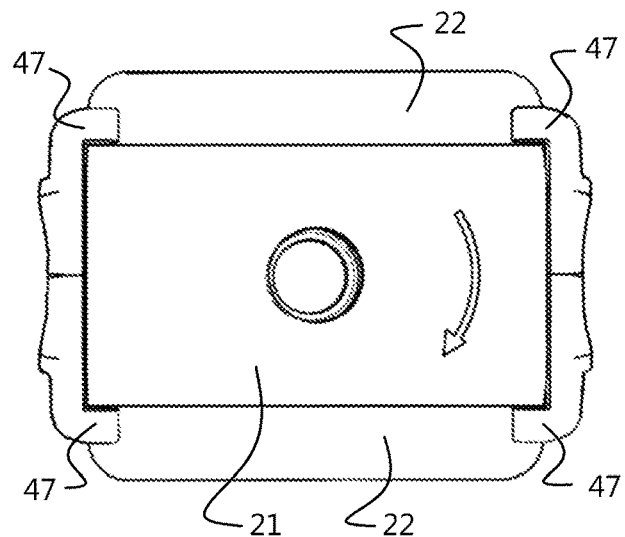
FIG. 6 shows a top elevational view of the channel fastener of FIG. 1.

At least the upstanding wall portions 49A have a height that exceeds the thickness of the anchoring element 3, as can be best seen in FIGS. 2, 4 and 5. In the embodiment shown in the figures the wall portions 49B also have a height that exceeds the thickness of the anchoring element 3, however these all portions 49B may also be lower or even with a slanting upper edge. When the anchoring element 3 is in engagement with the bottom plate 48, an upper edge 50 of at least the upstanding wall portion 49A is located above the anchoring element 3.

The connecting legs 42 are each extending from the main body 43 of the head portion 40 to the bottom plate 48 of the bottom portion 41. The connecting legs 42 extend along a longitudinal side of the oblong anchoring element 3, as can be best seen in FIGS. 3-5.

The main body 43 of the support 4 and the connecting legs 42 together have a tapering shape as can be best seen in FIGS. 4 and 9. The main body 43 has a greater width $w_{max}$ at an upper side and the width of the main body and the legs 42, lying in line with the outer contour of the main body 43, decrease towards the bottom portion 41. At the lower end of the legs the width $w_{min}$ is smaller than the width $w_s$ of the slot 106 of the channel element 100. The greater width $w_{max}$ exceeds in an unloaded state the width $w_s$ of the slot 106 of the channel element 100. It is noted that the main body 43 of the support 4 has a smaller dimension in a direction perpendicular to $w_{max}$, which dimension is preferably smaller than the width $w_s$ of the slot 106, such that when the channel fastener 1 is turned a quarter turn in the channel element 100, the main body 43 will not engage the flanges 104 anymore as will be described further below.

Figure 10:
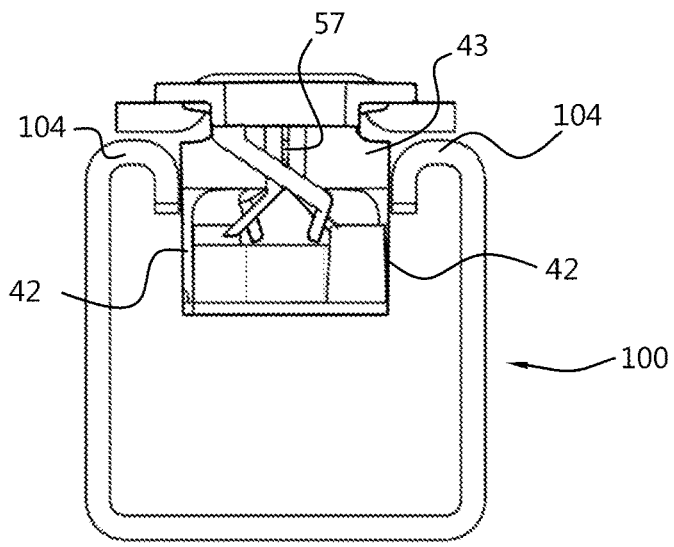
FIG. 10 shows a side elevational view of the fastener of FIG. 1 in a first preliminary mounting state.
Figure 11:
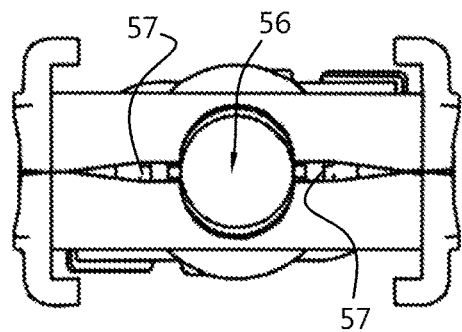
FIG. 11 shows a top elevational view of the support of FIG. 7 in an unloaded state.
Figure 12:
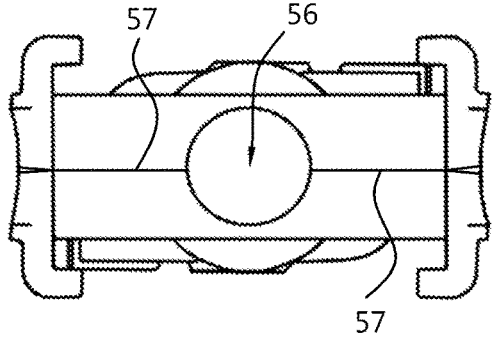
FIG. 12 shows a top elevational view of the support of FIG. 7 in the first preliminary mounting state of FIG. 10.

During installation, the user inserts the bottom portion 41 of the support 4 with the anchoring element 3 in the slot 106 of the channel element 100. This situation is shown in FIG. 9. The bottom portion 41 and the lower end of the connecting legs 42 fit between the flanges 104. When the bottom portion 41 of the channel fastener 1 is moved further into the channel element 100 the connecting legs 42 and or the main body 43 will start to rub against the flanges 104 of the channel element 100. This will cause a compression force on the main body 43 and possibly the legs 42. This compression force will result in a deformation of the main body 43 wherein the slits 57 will be deformed from an open state as is shown in FIG. 11 to a closed state which is shown in FIG. 12. In FIG. 10 is shown the state in which the main body 43 of the support 4 is thus resiliently clamped between the flanges 104 of the channel element 100. The channel fastener 1 can thus be held in this first preliminary mounting state on the channel element 100. If necessary, the user can still shift the channel fastener 1 longitudinally along the channel element 100 to move it to the desired position on the channel element 100.

The support 4 furthermore includes spring members 51. In the specific embodiment shown in the figures, the spring members 51 are associated with the head portion 40 of the support 4 at a longitudinal end portion of the washer support plate 44. The spring members 51 in this specific embodiment comprise tongues 52 which extend obliquely from an underside of the washer support plate 44 of the head portion 40 of the support 4 towards the anchoring element 3.

When the channel fastener 1 is in the first preliminary mounting state, as shown in FIG. 10, it can be rotated as is indicated by arrow 60 (cf. FIGS. 1-3). In this example the arrow 60 is provided on the top surface of the washer, but such an arrow may be omitted. The channel fastener 1 is thus rotated towards a second preliminary mounting state, which is shown in FIGS. 13-16. During the rotation the spring members 51 will engage the flanges 104 of the channel element 100 and rub over the upper side of the flanges 104. Thereby the spring members 51, in particular the tongues 52, will be flexed towards the washer element 2 which results in a spring force. When the fastener 1 is turned, preferably a quarter turn, as is shown in FIGS. 13-16, the respective flanges 104 enter a space between the washer element 2 and the longitudinal end portions of the oblong anchoring element 3. These spaces will be called herein an accommodation space indicated by reference numeral 61. The channel fastener 1 thus has two accommodation spaces 61 for accommodating the two flanges 104 of the channel element 100. When the flanges 104 are in the accommodation spaces 61, the spring elements 51 push the washer element 2 away from the upper side of the flanges 104 and pull the anchoring element 3 towards the underside of the flanges, in this case with the edge 105 of the flanges 104. Since the upper edge 50 of the respective longitudinal wall portions 49A extends above the upper side of the anchoring element 3, the upper edge 50 of the longitudinal wall portions 49A will be pulled in engagement with the edge 105 of the respective flanges 104, which is best visible in FIG. 14.

In the second preliminary mounting state the main body 43 will not be clamped anymore between the flanges 104, because it has a smaller longitudinal dimension than the width $w_s$ of the slot 106 as mentioned in the above. The user can slide the fastener 1 along the channel element 100. The flanges 104 of the channel element 100 are located in the accommodation spaces 61 and the upper edge 50 of the upstanding wall portions 49A engage the edge 105 of the flanges 104. The elastic nature of the plastic material of the support 4 allows that the respective wall portions 49A can slide over the edge 105 of the respective flanges 104. In particular this also works when the edge is serrated, i.e. provided with teeth, as is indicated in FIG. 13 by reference numeral 105A. The upper edge 50 of the wall portion 49A in rest resides between two teeth of the serration, but the wall portion can deform to pass the teeth of the serration during movement of the fastener 1 along the channel element 100. However, the wall portions 49A are sturdy enough to maintain the fastener 1 in position on the channel element 100, when it is not pushed along the channel element 100 by a user. The sturdiness is improved by the transverse wall portion 49B integrally formed with the longitudinal wall portion 49A, which provides rigidity to the corner piece 49. An advantage of the wall portions 49A engaging the edges 105 of the flanges 104 is that it does not depend on the thickness of the anchoring element 3 how easy the fastener can be slid along the channel element. It is noted that the thickness of anchoring elements may vary considerably due to tolerances in blank material and due to manufacturing tolerances. The dimensional relation between the wall portion 39A and the spring members 51 is better defined than the relation between the thickness of the anchoring element 3 and the spring elements 51. Therefore, and also due the flexible nature of the wall portion 39A the fastener 1 can provide a fairly constant and predefined holding force by the support 4 itself and thus a predefined and constant force to overcome the friction to move the fastener 1 along the channel element 100.

In the specific embodiment of the figures the support 4 furthermore includes one or more resilient retention fingers 53 having a proximal end 53A connected to the head portion 40 and a distal end 53B located near or in contact with the anchoring element 3, as can be best seen in FIGS. 2, 4, 5 and 8. The retention fingers 53 extend from the main body obliquely towards the upper side of the anchoring element 3 and are adapted to retain the anchoring element 3 on the bottom plate 48 of the support 4 in an unmounted state. The retention fingers 53 however allow that the anchoring element 3 is moved towards the washer element 2 when the washer element 2 and the anchoring element 3 are tightened together by a male fastening element, possibly in cooperation with a nut. Thereto the retention fingers 53 are resiliently deformable. The oblique position of the retention fingers 53 facilitates their deformation for allowing the anchoring element 3 to move towards the washer element 2. The retention fingers 53 allow the support 4 to be used flexibly with anchoring elements 3 with different thicknesses. It is noted that retention fingers can be omitted in theory, and that for example on an inner side of the connecting legs 52, a retention lug may be formed which extends over the upper edge of the anchoring element 3 as is known from the prior art (e.g. from U.S. D 494,887). Such a retention lug however is not as convenient in use when it comes to varying thicknesses of the anchoring element 3.

In the preliminary mounting position shown in FIGS. 13-16 a male fastener can be inserted through the passages 6 and 56 and screwed into the bore 5 in the anchoring element 3. A nut on the male fastening element can be used to tighten the channel fastener 100 on the channel element 100.

A blocking finger 54 is formed on an end of at least one of the spring members 51. The blocking finger 54 extends downwards under an angle with respect to the tongue 52. In the second preliminary mounting state as is shown in FIGS.

13-16, the tongue 52 rests on the upper side of the flange of the channel element 100 and the blocking finger 54 extends beyond the edge of at least one of the flanges 104 and a side wall 103 of the channel element 100, so as to block unintentional rotation of the fastener from that preliminary mounting state. This may for example be useful when the channel fastener 1 is released from a fixed state, in which the washer element 2 and the anchoring element 3 are clamped against the flanges 104, to a preliminary mounting state shown in FIGS. 13-16. For releasing the fastener 1, the cooperating male fastening element, e.g. a threaded rod and a cooperating nut are released and thus the nut is rotated counter-clockwise. The blocking fingers 54 prevent that the entire channel fastener 1 starts to rotate due to frictional forces.

The invention claimed is:

1. A channel fastener for fastening an object to an elongate channel element, wherein said channel element has a bottom, an upper side opposite the bottom and lateral walls that interconnect the upper side and the bottom, wherein the upper side includes flanges that extend from the lateral walls towards each other and a longitudinal slot defined between the flanges and having a slot width, wherein the fastener comprises an assembly of:
   a rigid washer element, preferably made of metal, having a bearing face that is arranged for resting against the outer side of the flanges of the channel element,
   an oblong metal anchoring element having a width smaller than the slot width and a larger length larger than the slot width, said anchoring element being located on the side of the washer element where the bearing face is located and has longitudinal end portions adapted to engage an inner side of the respective flanges of the channel element,
   a support for the anchoring element, which the support is connected to the washer element, possibly detachably, and which the support carries the anchoring element,
   the fastener having between the washer element and each longitudinal end portion of the anchoring element an accommodation space which is accessible from the side of the fastener, each accommodation space being adapted for the accommodation of a flange of the channel element, in such a way that the fastener with its oblong anchoring element can be aligned with the longitudinal slot and the anchoring element can be inserted through the longitudinal slot into the channel element, and in such a way that subsequently after turning of the fastener, preferably a quarter turn, the anchoring element extends at an angle, preferably substantially at right angles, relative to the longitudinal slot, so that the flanges of the channel element are located in the accommodation spaces, wherein the anchoring element and the washer element can subsequently be tensioned towards each other wherein the longitudinal end portions of the anchoring element engage the inner side of the flanges of the channel element in order to fix the fastener to the channel element,
   wherein the support comprises:
      a head portion having one or more coupling members, which the coupling members, possibly detachably, couple the washer element to the support,
      a bottom portion which supports the anchoring element from below, and
      connecting legs, each extending from the head portion to the bottom portion below the anchoring element, and connecting the head portion and the bottom portion, wherein the connecting legs extend along a longitudinal side of the oblong anchoring element,
   wherein the support is made of an elastic material and in that the head portion and the connecting legs of the support form a tapering width from the head portion towards the bottom portion of the support, wherein at least the head portion at the location where it adjoins the legs has an initial width that exceeds the width of the longitudinal slot, such that when the anchoring element is aligned with the longitudinal slot of the channel element and inserted through the slot in the channel element, the legs and/or the head portion rub against the flanges and are/is elastically compressed such that the fastener can be held clamped between the flanges in a first preliminary mounting state.

2. The fastener according to claim 1, wherein the support is made of a thermoplastic material.

3. The fastener according to claim 1, wherein the head portion of the support comprises a main body having a central passage from the washer element towards the anchoring element, wherein two longitudinal slits extend from the central passage in the main body, said longitudinal slits being opened wide in an unloaded state and being closed in the first preliminary mounting state.

4. The fastener according to claim 1, wherein the support includes one or more spring members associated with the head portion of the support, wherein said spring members force the bottom portion and the anchoring element towards the inner side of the flanges of the channel element in a second preliminary mounting state in which the flanges are located in the accommodation spaces.

5. The fastener according to claim 4, wherein the bottom portion comprises a bottom plate supporting the anchoring element and upstanding wall members extending upwardly from the bottom plate, wherein the upstanding wall members includes at least a longitudinal wall portion that extends at the longitudinal end portions of the anchoring element along a side of the anchoring element having the largest length, and wherein the upstanding wall portions have a height that exceeds the thickness of the anchoring element, such that when the anchoring element is in engagement with the bottom plate, an upper edge of the upstanding wall portion is located above the anchoring element and such that when the fastener is in the position wherein the flanges of the channel element are located in the accommodation spaces, the upper edge of the upstanding wall portions engage the inner side of the flanges in said second preliminary mounting state.

6. The fastener according to claim 5, wherein the upstanding wall members are located at two diagonally opposite corners of the oblong anchoring element.

7. The fastener according to claim 5, wherein the upstanding wall members furthermore comprise a transversal wall portion extending at an angle, preferably perpendicular, to the longitudinal wall portion, and forming a corner piece with the corresponding longitudinal wall portion.

8. The fastener according to claim 4, wherein the spring members are formed as tongues which extend obliquely from the head portion towards the anchoring element.

9. The fastener according to claim 4, wherein a blocking finger is formed on an end of at least one of the spring members, wherein said blocking finger extends in the second preliminary mounting state beyond the edge of at least one of the flanges and a side wall of the channel element, so as to block unintentional rotation of the fastener from the second preliminary mounting state.

10. The fastener according to claim 1, wherein the support includes one or more spring members associated with the bottom portion of the support, wherein said spring members force the anchoring element towards the inner side of the flanges of the channel element in a second preliminary mounting state in which the flanges are located in the accommodation spaces.

11. The fastener according to claim 1, wherein the support includes one or more resilient retention fingers having a proximal end connected to the head portion and a distal end located near or in contact with the anchoring element, so as to retain the anchoring element on the bottom portion of the support.

12. The fastener according to claim 1, further comprising a channel element having a bottom, an upper side opposite the bottom and lateral walls that interconnect the upper side and the bottom, wherein the upper side includes flanges that extend from the lateral walls towards each other and a longitudinal slot defined between the flanges and having a slot width, wherein the channel element has inwardly folded flanges, wherein the flanges have edges that are facing the bottom of the channel element.

13. The fastener according to claim 12, wherein the edge of the respective flanges are serrated.

14. A method for assembling the fastener of claim 12 to the channel element, wherein the fastener is mounted in a first preliminary state and a second preliminary state on the channel element before the fastener is finally secured to the channel element.

15. A channel fastener for fastening an object to an elongate channel element having a bottom, an upper side opposite the bottom and lateral walls that interconnect the upper side and the bottom, wherein the upper side includes flanges that extend from the lateral walls towards each other and a longitudinal slot defined between the flanges and having a slot width,
wherein the fastener comprises:
a rigid washer element, preferably made of metal, which has a bearing face that is arranged for resting against the outer side of the flanges of the channel element,
an oblong metal anchoring element having a width smaller than the slot width and a larger length larger than the slot width, said anchoring element being located on the side of the washer element where the bearing face is located and has longitudinal end portions adapted to engage an inner side of the respective flanges of the channel element,
a support for the anchoring element, which the support which support is made of an elastic material and is connected to the washer element, possibly detachably, and which the support bears the anchoring element,
the fastener having between the washer element and each longitudinal end portion of the anchoring element an accommodation space which is accessible from the side of the fastener, each accommodation space being adapted for the accommodation of a flange of the channel element, in such a way that the fastener with its oblong anchoring element can be aligned with the longitudinal slot and the anchoring element can be inserted through the longitudinal slot into the channel element, and in such a way that subsequently after turning of the fastener, preferably a quarter turn, the anchoring element extends at an angle, preferably substantially at right angles, relative to the longitudinal slot, so that the flanges of the channel element are located in the accommodation spaces, wherein the anchoring element and the washer element can subsequently be tensioned towards each other wherein the longitudinal end portions of the anchoring element engage the inner side of the flanges of the channel element in order to fix the fastener to the channel element,
wherein the support comprises:
a head portion having one or more coupling members, which the coupling members, possibly detachably, couple the washer element to the support,
a bottom portion which supports the anchoring element from below, and
connecting legs, each extending from the head portion to the bottom portion below the anchoring element, and connecting the head portion and the bottom portion, wherein the connecting legs extend along a longitudinal side of the oblong anchoring element,
wherein the bottom portion comprises a bottom plate supporting the anchoring element and one or more upstanding wall members extending upwardly from the bottom plate, wherein the upstanding wall members includes at least a longitudinal wall portion that extends at the longitudinal end portions of the anchoring element along a side of the anchoring element having the largest length, and
wherein the support includes one or more spring members forcing the bottom portion with the anchoring element towards the inner side of the flanges of the channel element in a preliminary mounting state in which the flanges are located in the accommodation spaces,
wherein the upstanding wall portions have a height that exceeds the thickness of the anchoring element, such that when the anchoring element is in engagement with the bottom plate, an upper edge of the upstanding wall portions is located above the anchoring element and such that when the fastener is in the position wherein the flanges of the channel element are located in the accommodation spaces, the upper edge of the upstanding wall portions engage the inner side of the flanges in said preliminary mounting state.

16. The fastener according to claim 15, wherein the upstanding wall members are located at two diagonally opposite corners of the oblong anchoring element.

17. The fastener according to claim 15, wherein the upstanding wall members furthermore comprise a transversal wall portion extending at an angle, preferably perpendicular, to the longitudinal wall portion, and forming a corner piece with the corresponding longitudinal wall portion.

18. The fastener according to claim 12, wherein the one or more spring members are associated with the head portion of the support.

19. The fastener according to claim 18, wherein the spring members extend from the head portion of the support element into the accommodation space, such that when the fastener is rotated in the channel element towards the second preliminary mounting state, the spring members will be deformed and tensioned by the flanges of the channel element.

20. The fastener according to claim 19, wherein the spring members are formed as tongues which extend obliquely from the head portion towards the anchoring element.

21. The fastener according to claim 18, wherein a blocking finger is formed on an end of at least one of the spring members, wherein said blocking finger extends in the second preliminary mounting state beyond the edge of at least one of the flanges and a side wall of the channel element, so as to block unintentional rotation of the fastener from the second preliminary mounting state.

22. The fastener according to claim 15, wherein the support is made of a thermoplastic material.

23. The fastener according to claim 15, wherein the support includes one or more resilient retention fingers having a proximal end connected to the head portion and a distal end located near or in contact with the anchoring element, so as to retain the anchoring element on the bottom portion of the support.

24. A channel fastener for fastening an object to an elongate channel element having a bottom, an upper side opposite the bottom and lateral walls that interconnect the upper side and the bottom, wherein the upper side includes flanges that extend from the lateral walls towards each other and a longitudinal slot defined between the flanges and having a slot width,
wherein the fastener comprises:
a rigid washer element, preferably made of metal, which has a bearing face that is arranged for resting against the outer side of the flanges of the channel element,
an oblong metal anchoring element having a width smaller than the slot width and a larger length larger than the slot width, said anchoring element being located on the side of the washer element where the bearing face is located and has longitudinal end portions adapted to engage an inner side of the respective flanges of the channel element,
a support for the anchoring element, which the support is connected to the washer element, possibly detachably, and which the support bears the anchoring element,
the fastener having between the washer element and each longitudinal end portion of the anchoring element an accommodation space which is accessible from the side of the fastener, each accommodation space being adapted for the accommodation of a flange of the channel element, in such a way that the fastener with its oblong anchoring element can be aligned with the longitudinal slot and the anchoring element can be inserted through the longitudinal slot into the channel element, and in such a way that subsequently after turning of the fastener, preferably a quarter turn, the anchoring element extends at an angle, preferably substantially at right angles, relative to the longitudinal slot, so that the flanges of the channel element are located in the accommodation spaces, wherein the anchoring element and the washer element can subsequently be tensioned towards each other wherein the longitudinal end portions of the anchoring element engage the inner side of the flanges of the channel element in order to fix the fastener to the channel element,
wherein the support comprises:
a head portion having one or more coupling members, which the coupling members, possibly detachably, couple the washer element to the support,
a bottom portion which supports the anchoring element from below, and
connecting legs, each extending from the head portion to the bottom portion below the anchoring element, and connecting the head portion and the bottom portion, wherein the connecting legs extend along a longitudinal side of the oblong anchoring element, wherein the support includes one or more spring members associated with the head portion of the support and adapted to engage an upper side of the flanges, wherein said spring members force the bottom portion with the anchoring element towards the inner side of the flanges of the channel element in a preliminary mounting state in which the flanges are located in the accommodation spaces,
wherein a blocking finger is formed on an end of at least one of the spring members, wherein said blocking finger extends in the second preliminary mounting state beyond the edge of at least one of the flanges and a side wall of the channel element, so as to block unintentional rotation of the fastener from the second preliminary mounting state.

25. A channel fastener for fastening an object to an elongate channel element having a bottom, an upper side opposite the bottom and lateral walls that interconnect the upper side and the bottom, wherein the upper side includes flanges that extend from the lateral walls towards each other and a longitudinal slot defined between the flanges and having a slot width,
wherein the fastener comprises:
a rigid washer element, preferably made of metal, which has a bearing face that is arranged for resting against the outer side of the flanges of the channel element,
an oblong metal anchoring element having a width smaller than the slot width and a larger length larger than the slot width, said anchoring element being located on the side of the washer element where the bearing face is located and has longitudinal end portions adapted to engage an inner side of the respective flanges of the channel element,
a support for the anchoring element, which the support is made of an elastic material and is connected to the washer element, possibly detachably, and which support bears the anchoring element,
the fastener having between the washer element and each longitudinal end portion of the anchoring element an accommodation space which is accessible from the side of the fastener, each accommodation space being adapted for the accommodation of a flange of the channel element, in such a way that the fastener with its oblong anchoring element can be aligned with the longitudinal slot and the anchoring element can be inserted through the longitudinal slot into the channel element, and in such a way that subsequently after turning of the fastener, preferably a quarter turn, the anchoring element extends at an angle, preferably substantially at right angles, relative to the longitudinal slot, so that the flanges of the channel element are located in the accommodation spaces, wherein the anchoring element and the washer element can subsequently be tensioned towards each other wherein the longitudinal end portions of the anchoring element engage the inner side of the flanges of the channel element in order to fix the fastener to the channel element,
wherein the support comprises:
a head portion having one or more coupling members, which the coupling members, possibly detachably, couple the washer element to the support,
a bottom portion which supports the anchoring element from below, and
connecting legs, each extending from the head portion to the bottom portion below the anchoring element, and connecting the head portion and the bottom portion, wherein the connecting legs extend along a longitudinal side of the oblong anchoring element, characterized in that wherein the support includes one or more resilient retention fingers having a proximal end connected to the head portion and a distal end located near or in contact with the anchoring element, so as to retain the anchoring element on the bottom portion of the support.

* * * * *